Patented Dec. 2, 1952

2,620,311

UNITED STATES PATENT OFFICE 2,620,311

METHOD OF MAKING A LUMINOUS MULTI-PURPOSE SEALER COMPOSITION

Arthur B. Bleecker, San Francisco, Calif., assignor to The Norbal Company, San Francisco, Calif., a copartnership No Drawing. Application February 28, 1950,
Serial No. 146,915

1 Claim. (Cl. 252—301.2)

This invention relates to improvement in sealing compounds, and more particularly to sealants of the multi-purpose type which may readily be applied with equally high effectiveness to the porous surfaces of various materials such as brick, cement, concrete, canvas, wood and paper.

Transparent sealants have been extensively used heretofore, both as a protective undercoating and as a means of waterproofing a porous surface so as to fully protect the surface from moisture and water-borne stains. It is therefore desirable that such a sealant be not only clear, colorless and water repellent, but also that it be capable of being uniformly applied to the porous surface by various means, such as brushing, spraying, dipping or mopping. Considerable difficulty has frequently been experienced in applying such clear and colorless sealant in the form of a coat of substantially uniform thickness applied uniformly to all portions of the surface to be sealed, and in later determining whether such sealant has been applied, particularly after an overcoat of paint or other finishing compound has been applied to the porous surface.

It is an object of the present invention to provide an improved sealant or protective coating agent of the character and for the purpose described.

It is a further object of the invention to provide a liquid coating and penetrating agent which is easily applied to a porous surface, which is colorless and which effectively seals the surface.

It is a further object of the present invention to provide a clear and colorless sealant whose uniform application to a porous surface may readily be determined either before or after an overcoat of paint has been applied thereto.

Another object of this invention is to provide a clear and colorless sealing compound whose application to all portions of a porous surface can readily and positively be determined.

It is a further object of the present invention to provide a clear, colorless, penetrating and water repellent sealing compound whose application as an undercoat can be readily and positively determined.

It is also an object of this invention to provide a sealing compound whose presence can be determined even after an overcoat layer has been applied to the sealer surface.

These and other objects of the invention will be apparent from the ensuing decription and the appended claim.

The composition of my invention comprises a solution or dispersion of a certain type of water repellent material in a substantially non-aqueous solvent, and in its preferred form it also includes a substance which is soluble in the materials used and which fluoresces in the visible spectrum when exposed to ultra violet radiation.

In preparing my sealant composition, the following ingredients are preferably dissolved in about the following proportion and in the order given. Parts are by weight except as otherwise indicated.

200 parts of high solvency petroleum solvent
(heated to a temperature not exceeding 180° F.)
30 parts of high purity aluminum stearate
2 parts of acetic acid
10 parts n-butyl alcohol The resulting solution is then allowed to cool to a temperature of approximately 110° F., after which the following ingredients are added in the order named:

100 parts of high solvency petroleum solvent
12 parts n-butyl alcohol
$\frac{1}{16}$ part anthranilic acid Sufficient n-butyl alcohol and acetic acid are then added to the final solution in the proportion required to adjust the viscosity of the resulting solution to —A to C in the Gardner viscosity scale.

It will, of course, be understood by those skilled in the art that other alcohols and fatty acids may be substituted for those given above without departing from the scope of the instant invention. Other examples of suitable anhydrous alcohols which may be substituted for n-butyl alcohol are ethyl alcohol and iso-propyl alcohol. Likewise other fatty acids of the type R—COOH, such as the propionic acids and iso-butyric acids may be substituted for acetic acid, although some adjustment in the amounts and proportions of the alcohol and fatty acid will be required.

Anthranilic acid is added for its fluorescent property, and it may be added at any time after the basic solution has been heated and then cooled down to approximately 110° F. Various materials other than anthranilic acid which are soluble in the materials used and which fluoresce upon exposure to ultra violet light, may be used if desired. Other fluorescent materials which have been found useful for the purposes of the present invention are anthracene, ethyl dihydrocollidine, dicarboxylate; phenanthrene, dihydroxybenzoic acid and commercially available fluorescent dyes, such as Acetate Fluorescent Blue, Calcozine Red BX, and Fluorescent Yellow HEB.

With regard to the solvent or vehicle, any suitable non-aqueous water-insoluble which may be used in which the aluminum stearate is soluble. Preferably a volatile paint thinner such as naphtha is used.

Other sealant materials than aluminum stearate may be employed; e. g., aluminum salts of other high molecular weight fatty acids such as lauric and palmitic acid. Other polyvalent metals than aluminum may be used, e. g. iron (ferric), calcium, barium and strontium, also lithium, provided only that their salts have a sealant effect. Aluminum salts are particularly resistant to acids and ferric salts are particularly resistant to bases. Hence, if conditions are such that exposure to acids is likely, aluminum salts will be preferred. If conditions are such that exposure to bases is likely, then ferric salts may be preferred.

In use, my sealant composition is applied to a porous surface by any convenient means, such as brushing, spraying, dipping or mopping. On horizontal porous surfaces the sealant can be puddled and then spread with a squeegee. In some instances a second coat may be applied to provide improved water repellency, and since the sealant is clear and colorless no substantial darkening of delicate woods or other interior finishes results.

Since the sealant disclosed herein is both clear and colorless, the uniformity of its application to a surface is difficult to determine by normal visual means. However, my preferred sealant contains a material such as anthranilic acid which fluoresces in the visible spectrum when exposed to black light or ultra-violet light in a darkened room. By this means the uniformity of application of the sealant is made readily apparent. Since an even, substantially uniform distribution of the sealant over a porous surface is important to prevent blistering of an overcoat of paint, and to give greater paint coverage, the advantages of uniform distribution of the sealant becomes readily apparent. Also, the improved durability and appearance of porous surfaces having such an undercoat of sealant can be readily determined by re-exposing the surface to ultra violet light long after a non-transparent top coat of paint or the like has been applied to the sealant coating; the fluorescent characteristics of the underlying sealant layer continue throughout the service life of the finished surface.

It will thus be apparent that a sealant composition has been provided which is applicable to porous surfaces to seal the same against egress and ingress of moisture; which provides a proper undercoat for subsequent application of paint; and which, although clear and colorless, which itself is highly desirable, is detectable or observable by means of ultra-violet light, even through an overcoat of paint, for purposes of inspection.

I claim:

A method of preparing a fluorescent coating composition which comprises providing a non-aqueous, volatile vehicle, heating the same to a temperature substantially above 110° F. but not exceeding about 180° F., dissolving in the heated vehicle a quantity of a polyvalent metal salt of a higher fatty acid in quantity sufficient to act as a sealant when the composition is applied as a film to a porous surface, also incorporating in the heated vehicle a small amount of a lower fatty acid and a lower fatty alcohol, allowing the solution to cool to about 110° F. and then adding a small amount of a fluorescent material sufficient to produce fluorescence visible to the naked eye when a film of the composition is exposed to ultra-violet radiation.

ARTHUR B. BLEECKER.

REFERENCES CITED

The following references are of record in the file of this patent:

UNITED STATES PATENTS

| Number | Name | Date |
| --- | --- | --- |
| 1,637,963 | Sauvage | Aug. 2, 1927 |
| 1,858,830 | Kratoville | May 17, 1932 |
| 2,169,577 | Bradley | Aug. 15, 1939 |
| 2,259,400 | Switzer | Oct. 14, 1941 |
| 2,297,033 | Stahr | Sept. 29, 1942 |
| 2,436,182 | Schmidling | Feb. 17, 1948 |
| 2,472,522 | De Forest | June 7, 1949 |